Sept. 9, 1969

R. C. McMASTER ET AL 3,466,388

X-RAY TELEVISION INSPECTION SYSTEM WITH
SELENIUM CAMERA TUBE TARGET

Original Filed Dec. 29, 1961

INVENTORS
ROBERT C. McMASTER
JAY P. MITCHELL
MERLE L. RHOTEN

By Anthony D. Cennamo
ATTORNEY

United States Patent Office 3,466,388
Patented Sept. 9, 1969

3,466,388
X-RAY TELEVISION INSPECTION SYSTEM WITH SELENIUM CAMERA TUBE TARGET
Robert C. McMaster, Jay P. Mitchell, and Merle L. Rhoten, Columbus, Ohio, assignors to The Ohio State University Research Foundation, a corporation of Ohio
Continuation of application Ser. No. 162,500, Dec. 29, 1961. This application Oct. 13, 1967, Ser. No. 697,249
Int. Cl. H04n 7/02
U.S. Cl. 178—6     6 Claims

ABSTRACT OF THE DISCLOSURE

A closed circuit television system that provides a continuous in-motion high contrast enlarged X-ray image for remote viewing and inspection of the specimen or material. A modified camera tube is provided having a selenium target of a selected thickness, an intensifier layer, and a window of low absorption material. The system is operable in a positive or negative mode.

---

The strength and serviceability of materials employed in industrial products can be significantly influenced by load-bearing cross-sections, the lay of successive fibers in composite materials, the presence of void areas, or other discontinuities. The assemblies of these materials are often more complex than the past techniques required, so that the prior art systems do not provide an adequate means of nondestructive inspection for the critical conditions. The lack in reliability has tended to be a deterrent to the wide acceptance of these materials for certain uses.

In the electronic industry, components like the transistor, tunnel diodes, or other semiconductor elements, are extremely small in size, but yet because of the performance reliability requirements, present production processes do not permit exact duplication of parts and assemblies free of faulty structures. For instance, one major industry radiographed 450,000 commercially manufactured transistors and found an exceptionally large number to be defective. It is necessary, therefore, that these components be examined on the production line during manufacture. With most of these products, the essential inspection requires internal examination. However, since these components are extremely small, and in most instances have a metallic casing, visual internal inspection is precluded and with the prohibitive cost of radiographic inspection no other practical means is available.

In still another industry, that of manufacturing welded components or brazed honeycomb structures, such as solid propellant missile case walls, the weldments are subject to extremely severe service conditions. A minute discontinuity or otherwise defective bond my lead to a catastrophic failure. With steel wall thicknesses of the order of $\frac{1}{10}$ inch, maximum detail resolution is required for conventional X-ray inspection of the correspondingly small weld dimensions. Film radiography becomes costly since images must be examined under considerable magnification if discontinuities (such as cracks with dimensons approaching $\frac{1}{1000}$ inch) are to be detected and resolved clearly. The need, therefore, exists for more reliable and sensitive nondestructive testing techniques for the detection of these weldment discontinuities.

Industrial X-ray inspection of materials and components is a major instrument of the industrial production process in American industries. It is used in critical inspection of primary structural parts of aircraft, jet engines, ordnance, and nuclear energy installations. Typical large industrial plants may use from $40,000 to $60,000 of X-ray film monthly, and the total of their X-ray inspection costs may be from three to four times this amount monthly. It appears probable that the total annual demand, when full defense production has been achieved, will be of the order of $175,000,000 to $200,000,000 of industrial X-ray film annually.

The present extent of use of X-ray inspection in industry, even the expanded rate of use under defense or war production conditions, is not the maximum or optimum rate of use of X-ray inspection. Instead, the use of X-ray inspection is severely limited by economic conditions. The present cost of X-ray film, together with handling of test objects, exposure, processing and interpretation of films, raise the cost to about $2.00 per square foot. Many test objects require two or three exposures (different views) to provide complete X-ray inspection. Thus, at present, there are many critical items of aircraft production in which the cost of X-ray inspection exceeds the cost of fabrication of the parts. In many cases, specifications call only for percentage inspection; 10 or 25 percent of the parts in each lot are subjected to X-ray inspection—and the entire lot is accepted or rejected on the basis of these samples. This situation is certainly unsatisfactory; frequently, defective units in the uninspected portion of the lot go into production. A reliable and practical low-cost method of X-ray inspection would immediately increase the market for X-ray inspection, by permitting 100 percent examination of all critical parts. In addition, reduction in X-ray inspection costs would make it economically feasible to inspect many more critical parts in industrial production; as a first-order approximation, it appears probable that a reduction of the cost of industrial X-ray inspection to 25 percent or less of present costs would increase the use of industrial X-ray inspection by an additional factor of ten times.

To be useful in industrial X-ray inspection, the X-ray images must meet certain critical requirements. In most cases, specifications for aircraft production radiography call for 2 percent contrast sensitivity, as indicated by standard penetrameters. Such a standard implies that a cylindrical cavity, whose diameter is equal to 2 percent of the section thickness of the part under inspection, would be clearly revealed in an X-ray image. With conventional X-ray films, a density difference of 0.02 H. & D. units is assumed to be clearly visible under optimum film-viewing conditions; therefore, the defect or cavity should be shown by a density difference of this order on the film image. Under optimum conditions, the contrast sensitivity achieved in commercial X-ray inspection of flat sections approaches 1 percent. In the radiography of spotwelds in aluminum alloy sheets, contrast sensitivities of the order of 0.2 percent have been achieved under production inspection conditions. These excellent contrast sensitivity conditions are achieved in film radiography through the use of fine-grain, high-contrast X-ray films exposed under optimum conditions. Such films provide a gamma (or contrast amplification factor) of 3.5 to 4.5, and good definition. For higher voltage radiography, suitable intensifying screens are required to achieve acceptable definition and contrast requirements.

Industrial fluoroscopy, in which X-ray images are viewed on fluorescing zinc-cadmium-sulphide screens of relatively fine-grain size and high brightness, has received some acceptance in industry as a low-cost supplement to film radiography. Careful tests have revealed the limitations of fluoroscopy; in general, contrast sensitivities better than 5 percent are difficult to achieve under production inspection conditions. It has been shown that rotational, high-brightness fluoroscopy applied in the aircraft industry may exceed these limits. In this case, the brightness of the fluorescent screen was greatly increased by the use of very short source-object-distances (4-in. to 10-in.), and the equivalent of stereoscopic viewing was attained by moving the source with respect to the test object, to reveal defects normally hidden under bosses and thick sections of the test object.

However, the use of a fluoroscopic screen to reveal X-ray images has several basic limitations. First, the gamma or contrast amplification factor for available fluorescent screens is approximately unity; i.e., screen brightness increase approximately in proportion with X-ray beam intensity. Secondly, the grain size of fluoroscopic screens is relatively large (in comparison with the grain of films), so that resolution is limited. Thirdly, the screen brightness apparently does not increase in proportion with X-ray intensity, as the source kvp. (kilovolts peak applied to the X-ray tube) increases above 150 kvp. Consequently, fluoroscopy has not been developed for million and multi-million volt radiography, nor, in general, for the inspection of steel parts. Tests with skilled observers with high visual acuity have revealed the limitations of viewing; dark adaptation is usually required; fatigue lowers accuracy after thirty minutes of continuous inspection; and, under optimum conditions, such skilled observers seldom can see more than about 45 lines to the inch in high-contrast images, even though 65 lines to the inch have been resolved photographically from the fluorescent screen image. Recent studies have confirmed the basic limitations of fluoroscopy.

Various types of electronic image amplifiers have been designed to reproduce the image from fluorescent screens, adding brightness, contrast amplification, or enlargement. Each of these methods is necessarily limited by the limitations of the fluorescent screen used to convert the original X-ray image into visible light; these limitations are so severe (quantitatively) that there is little prospect that any device dependent upon a conventional (or even a fine-grain conventional) fluoroscopic screen will ever attain the utmost resolution and contrast sensitivity desirable in X-ray images for industrial inspection. Instead, it is critically important to replace such fluoroescent screens with X-ray image conversion devices with resolutions of the order of 500 or more lines to the inch, with the ability to integrate the effects of X-ray exposure (as does film), and with high inherent contrast response (or gamma). A further serious limitation to the industrial uses of X-ray and fluoroscopy is the ever present inherent danger to the user. Protective clothing, special shielding, film badges, special handling, and health hazards to the operator, all tend to limit the utility of the apparatus. Or alternatively, as pointed out above, radiographic techniques must be employed at considerable cost and questionable efficiency. In brief, an instantaneous X-ray inspection system with contrast sensitivity and detail resolution capabilities equivalent to optimum film radiography techniques using fine-grain high-contrast film is needed to lower X-ray inspection cost, increase inspection speed and permit in-motion inspection under production conditions.

SUMMARY OF INVENTION

To overcome the preceding considerations and limitations of the prior art systems, the present invention provides an entirely new method and means of revealing high-contrast and enlarged X-ray images for remote viewing and interpretation. Unlike most previous systems, the invention involves no intermediate conversion of X-ray images into light; instead, the X-ray image is converged directly into electrical signals within a modified television camera tube. The electrical signals produced as the result of the scanning action of an electron beam in this tube are amplified, modified, increased in contrast, and reproduced at any desired size amplification upon suitable viewing screens by conventional television circuit techniques. Remote image system eliminates costs and time delays of film radiography and permits in-motion examination of speciments and test objects with complete radiation protection of the viewing inspector. Also within the scope of the invention, a new and improved television camera tube has been designed. To achieve the desired results the camera tube of the preferred embodiment includes a relatively thick selenium target, may embody for certain instances a dense metal intensifying layer, and a low density material for the face plate.

OBJECTS

It is accordingly a principal object of the present invention to provide a new and improved nondestructive system for the inspection and testing of materials, components, assemblies, structures, bonds, and other products under production conditions.

It is a further object of the present invention to provide a new and improved nondestructive inspection and testing system for the internal and structural examination of components and materials.

Another object of the present invention is to provide a new and improved nondestructive system for the inspection of materials, components and bonds remotely positioned from a visual or radiographic readout station.

Another object of the present invention is to provide a new and improved nondestructive system for the inspection of materials, components and bonds and to reproduce the structure under inspection on a greatly enlarged scale.

Another object of the present invention is to provide a new and improved nondestructive system for the continuous in-motion inspection of materials, components and bonds without blurring or loss of detail.

Another object of the present invention is to provide a new and improved television camera tube having a sensitive layer that provides maximum response to penetrating radiation without a loss of detail resolution.

Another object of the present invention is to provide a new and improved television camera tube incorporating a faceplate having good transmission of long wavelength radiations.

Another object of the present invention is to provide a new and improved television system that is operable in the positive and negative modes.

Still another object of the invention is to provide a new and improved nondestructive system for the inspection of materials that utilizes certain standard components requiring only a minimum of modification.

Further objects and features of the present invention will become apparent from the following detailed description when taken in conjunction with the drawings in which:

DETAILED DESCRIPTION OF THE DRAWINGS

Figure 1:
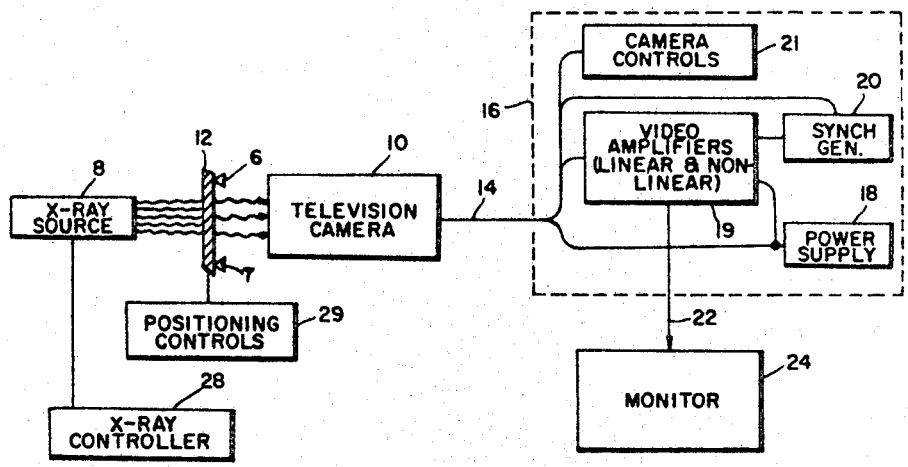
FIG. 1 is a block schematic diagram of the present invention.

Referring now to FIG. 1, there is illustrated the basic components that make up the system of the present invention. Generally, the system comprises a television camera 10 responsive to X-ray images from the X-ray source 8 of the workpiece material 12. The camera 10 is connected by means of a cable 14 to the camera control unit 16. This unit 16 further comprises camera controls 21, video amplifier 19, a power supply 18, and scan synchronizing generator 20. The control unit 16 in turn is connected by the video coaxial cable 22 to the kinescope or monitor unit 24. More specifically, the television camera unit 10 is located in the X-ray exposure area so as to receive the X-rays transmitted through the test material 12 from a fine-focus X-ray source 8. Only camera 10 need be in the area exposed to ionizing radiations from the source 8. The X-ray source 8 is operated by remote X-ray controls 28. The specimen-positioning and scanning devices to position and move the test specimens during inspection are operated by the positioning controls 29.

The balance of the electronic system including the components in control units 16, the viewing monitor 24, as well as the X-ray controls 28 and the positioning controls 29, are located in a radiation-safe area at a convenient location for the inspector. Large-screen picture tubes (such as 10 to 27 inch diagonal measurement or of the projection type) are provided in one or more viewing monitors 24, to permit direct viewing of enlarged X-ray images without further optical aids or image enlargement.

It may be noted that the preferred embodiment described herein utilizes a conventional X-ray source; however, it is understood that the invention is not to be so limited. Other types of penetrating radiation sources that could readily be substituted for the X-ray source 8 are a radioisotope emitting gamma radiation, target generated bremsstrahlung, betatron, a linear accelerator, diffracted and fluorescence X-rays, or any other suitable source of penetrating radiation. However, to minimize geometric unsharpness in the radiation beam, the beam must have a fine focal point and be preferably of the order of seven millimeters.

In operation of the system of FIG. 1, a test object, material, specimen or other workpiece 12 is positioned between the camera 10 or pickup tube and the X-ray source 8. In practice, it has been found that high radiation intensities and hence sharper images are obtained when the workpiece 12 is positioned as close as possible to the X-ray sensing television camera 10. The workpiece 12, in accordance with present invention, may be a single stationary object, a series of stationary or moving objects, or may be a continuously or intermittently moving strip, and the positioning of the workpiece is by conventional means 6 and 7 controlled by positioning means 29. The primary purpose of the camera 10, as set forth in detail hereinafter, is to receive the unabsorbed radiation, that is, the radiation passing through the workpiece 12, and to relay the image as an electrical signal to the television monitor 24. The electrical signal from the television camera 10 and the control signals for operation of the camera 10 are transmitted via cable 14 to the camera control unit 16. There is included in unit 16 a dual function video amplifier 19. In addition to linearly amplifying the video signals the amplifier 19 includes a nonlinear amplifier for for the gamma (black stretch) control. Also included in this unit are the conventional camera controls 21, the scan and synchronizing generator 20 and the power supply 18. The amplified signal from the video amplifier 19 is fed over cable 22 to the television monitor 24. This monitor includes a conventional type of television picture tube preferably of the large screen or projection type.

The preferred embodiment of the X-ray image system results in image enlargement and amplification of the test objects with microscopic resolution. With the use of small (1-in.) diameter photoconductive target television camera tubes (described hereinafter) as direct sensing media for the penetrating radiations, the imposed images from the ⅜-in. by ½-in. sensing areas are reproduced upon the phosphor screens of large-diameter (17-in. to 21-in.) kinescope picture tubes. This provides direct electronic high resolution image enlargements of the order of 30×. Closed-circuit television chains permit the enlarged X-ray images to be viewed at a distance from the X-ray exposure area, so that complete protection from ionizing radiations can be provided to inspection personnel. Standard 525-line, interlaced, 30 frame per second scanning systems are preferred, so that signals are fully compatible with commercial television systems, including transmission and video tape recording equipment. Horizontal resolution exceeds 650 lines, and the 750-mesh screen within the camera tubes can be clearly resolved, in the studio-quality research equipment. With some 500 scanning lines in the ⅜-inch input picture height, and with comparable horizontal resolution, more than 1200 lines per inch are provided in scanning the target, with a resolution of the order of 1/1000 inch. This has proven to be sufficiently sensitive for the detection of small discontinuities in materials and weldments with a resolution comparable to that of Class I fine-grain X-ray film.

The overall system gamma values (or contrast amplification and referred to as black stretch) can be adjusted as desired in the range from $\gamma=1$ to $\gamma=4$ or higher by the nonlinear amplifier 19 of FIG. 1. This compares favorably with the film gradient values $m$, characteristic of Class I X-ray films that have been exposed and developed to film densities of 0.5 to 2.0 H. & D.

The overall X-ray television system gamma is a measure of the contrast ratios in the output kinescope image and the input X-radiation image:

$$\Delta B \& B = \gamma_o (\Delta I_x / I_x)$$

As in film radiography, the output image must provide a minimum brightness ratio between adjacent image areas for detection by the observer. The well-known density difference of 0.02 H. & D. usually accepted for film viewing of penetrameter images corresponds to a transmitted brightness ratio of the order of $(\Delta B/B) \times 100 = 4.72$ percent. If this limit were assumed for viewing of kinescope images, the limiting percent contrast sensitivity of the camera tube X-ray image enlargement system might be taken as:

(3) $\quad$ Percent $\Delta x / x = 4.7 / \gamma_o \mu x$

The overall television system gamma has about the same significance as the well-known film gradient $m$ in determining image contrast.

In a system involving a sequence of image-transferring elements, the overall system gamma is equal to the product of the individual gammas of the sequential elements. Thus, for the closed circuit television, the system gamma would be given by:

$$\gamma_o = \gamma_v \gamma_e \gamma_k$$

where:

$\gamma_o$ = overall X-ray television system gamma.
$\gamma_v$ = camera tube gamma.
$\gamma_e$ = electronic amplifier chain gamma.
$\gamma_k$ = kinescope (picture tube) gamma.

For a typical case in which the camera tube gamma is equal to $\gamma_v = 0.9$, the electronic chain gamma is $\gamma_e = 1.0$, and the kinescope gamma is $\gamma_k = 3.0$, the overall gamma is:

(4) $\gamma_o = (0.9)(1.0)(3.0) = 2.7$ $\quad$ (approximately)

This overall gamma value, consistently attained with glass-window camera tubes in the present system, corresponds to the film gradient attained with Class I X-ray film exposed and developed to a density near 1.2 H. & D. However, the preceding values of camera tube gamma correspond to glass-window camera tubes operating with typical glass-window X-ray sources. With the 150 kvcp. beryllium-window X-ray source and with beryllium-window camera tubes (as hereinafter explained in detail), overall gamma values apparently of the order of 3 to 10 have been measured at lower X-ray source kilovoltages.

If the overall gamma value of 2.7 from Eq. 4 is taken for insertion into Eq. 3, the predicted contrast sensitivity of the X-ray image system with glass window camera tubes would appear to be about:

(5) $\quad$ Percent $\Delta x / x = (4.72)/(2.7)\mu_x = 1.75/\mu_x$

Penetrameter sensitivities of true 2 percent (1T hole visible in penetrameter whose thickness is 2 percent of test material thickness) have been observed with ⅛-in. and ¼-in. steel, with several different glass-window tubes.

Figure 2:
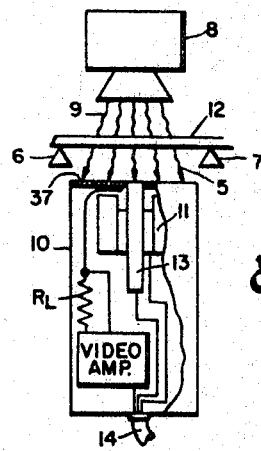
FIG. 2 is a schematic sketch showing the relative positions of X-ray source, specimen, and television camera.

Of critical importance to the operation of the system is the X-ray sensitive camera unit 10 as shown in FIG. 2. This unit contains the sensitive camera tube, initial video amplifier, and the load resistor R to convert the current at the signal point 37 to a voltage. Also shown in FIG. 2 is the position of the specimen relative to the camera.

The X-ray-sensing camera tube is a primary component of the X-ray image enlargement system of the present invention. With the exception of the X-ray window, intensification screen, and X-radiation-responsive target layer, its construction is similar to those of light-sensing camera tubes.

Figure 3:
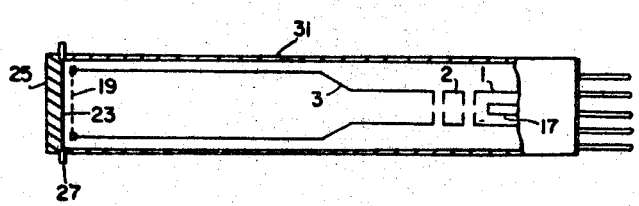
FIG. 3 is a schematic illustration of the television camera tube.

The conventional light-sensing camera tube is enclosed in an evacuated glass envelope 31 approximating a cylinder about one inch in diameter and about six inches in length. The physical arrangement of its internal components is sketched in FIG. 3. Light images are focused through the transparent faceplate 25 upon the photoconductive target layer 23. The target layer 23 is deposited over a thin, electrically conducting layer on the faceplate 25, which serves as a signal electrode and is connected to the external signal ring 27 adjacent to the faceplate. The inner surface of the target, or photoconductive layer, is scanned repetitively by a low velocity electron beam emitted from an electron gun near the opopsite end of the camera tube. External deflection and focusing coils deflect and concentrate the electron beam so as to scan the target surface in a sequence of parallel lines covering the image area, as in common television camera and picture tubes. A fine, 750-mesh screen 19 located just in front of the target layer serves to decelerate the electron beam to low velocities prior to its incidence upon the target. The electron beam current is maintained sufficiently large so that each element of surface on the gun side of the target layer is restored to essentially cathode potential during each scan.

The signal plate, or thin conducting layer beneath the photoconductive target layer, is maintained positive with respect to the cathode 17 by an externally applied voltage. In the interval between scans, wherever the photoconductive layer is conductive due to irradiation with light images, migration of electrical charge through the target layer 23 from the signal plate causes the inner target surface potential to rise toward that of the signal plate. On the next scan, the electron beam deposits a sufficient number of electrons to return the target surface to cathode potential. A current flow due to the capacitive coupling between the target surface and the signal plate produces a voltage drop across the external load resistor. The voltage drop across a load resistor (FIG. 2) proportional to the charge built up on the target surface between scans. The fluctuating voltage that apepars across the load resistor becomes the video signal that is amplified and transmitted through the closed-circuit television chain to the monitor or output picture tube.

The prior art light-sensing camera tubes perform very poorly as direct X-ray sensors. Photoconductive target layers are so thin that little X-ray absorption occurs, and output signals rarely exceed television system noise levels. The heavy optical glass flats used as windows in light-sensing tubes also absorb and scatter X-radiation considerably. Use of intervening layers of phosphors, such as are used in fluoroscopic screens, to convert X-radiation into light which would then activate the target, results in loss of detail resolution. Thus, camera tube designs must be altered considerably in carrying the principles of the present invention to attain optimum X-ray response and image detail.

The first modification of the camera tube in accordance with the teachings of the present invention is that the target or sensing layers are redesigned to provide direct X-ray response with high resolution capabilities. It is necessary that the target material provide good response to penetrating radiation, rather than to light. The target layer thickness must be selected to provide maximum response to X-rays, without loss of detail resolution. Photoconductive lag effects must be minimized, if blurring of moving images is to be avoided. Various photoconductors have been investigated, and few have met those requirements. For instance, lead oxide layers tend to have photoconductive lag, even though their density assists in absorption of X-rays and in output signal levels. However, it was found that selenium, used in early developments of xeroradiography, does provide adequate response with a minimum of undesirable photoconductive lag effects. Specifically, in accordance with the invention, it was found that the signal response increases as the selenium target thickness incerases. It was further found that the signal attains a peak in the range of 25 to 35 microns target thickness and the signal diminishes as the target thickness is increased. However, improved results over conventional light-sensing tubes were obtained with selenium target thicknesses varying from 5 to 300 microns. 1 micron=$10^{-4}$ cm.=approx. 40 microinches.) In a preferred embodiment utilizing selenium target of sufficient thickness, it was proven that the X-ray signal response has been increased from the level of perhaps $4 \times 10^{-9}$ amperes at 100 r./min. input with light sensing tubes, to the order of $4 \times 10^{-8}$ amperes at 100 r/min. or by about 1000 percent. The target, or sensing layer 23, for X-ray images, in the camera tube of FIG. 3 can serve either as a photoconductor or photoemitter responding to incident X-ray beams. High input radiation levels, preferably of the order of 30 to 100 roentgens per minute at the tube face, are desirable to obtain good signal-to-noise ratios in the video output signals. Care is required in the deposition of target layers, to avoid artifacts that appear continuously in X-ray images. Electrostatic shielding of the tube face and signal ring is required to avoid external interference effects. Light must also be excluded from the target layer. Shielding and light exclusion can be obtained readily, as by means of a thin layer of aluminum foil placed over the tube face and connected to ground (the camera case).

Operating with 525 lines, interlaced, with 30 frame per second scanning, the camera image contains 525 picture lines in its ⅜-inch height, or approximately 1400 lines per inch. Horizontal resolution approaches 600 (RETNA image) lines, or at least 1200 lines per horizontal inch. Thus, an image resolution of the order of $\frac{1}{1000}$ inch becomes possible. Such detail resolution has been repeatedly demonstrated in tests.

Blurring of moving images due to photoconductive lag in the camera tube target materials appears to be negligible, and consequently, in-motion viewing of the enlarged images has been found to be feasible, without significant loss in detail resolution. In fact, motion appears to assist the observers in seeing fine discontinuities or geometric irregularities more readily than with stationary images. Motion-picture records (despite loss in information resulting from the additional reproduction processes) demonstrate comparable image characteristics. Since scanning frame integrates exposure over $\frac{1}{30}$ second, it is obvious that the frame scanning rate does provide a limitation on rates of movement of test specimens where fine detail is sought. However, a more significant limitation to date has been the ability of observers to interpret images moving across the enlarged kinescope picture tube screen at more than 5 to 10 inches per second. Most observers appear to prefer rates of image viewing not exceeding 3 to 30 inches per minute, depending upon the detail resolution sought, and the number of significant discontinuities to be deteced in particular specimens. With 30×image magnification, these viewing rates correspond to specimen velocities in the range from 0.1 in. to 1 in. per minute. In general, viewing rates are comparable to film reading rates.

The X-ray response of most photoconductive materals diminishes as X-radiation wavelengths become shorter since loss radiation absorption occurs in the target layer. For example, about 20 perecnt decrease in response to 100 r./min. occurs as the kilovoltage of a conventional X-ray source is increased from 100 to 200 kvp., with glass-window camera tubes. A smaller decrease occurs with beryllium-window camera tubes, but it is still measurable. Thus, for improved response to high-voltage radiation, the present invention further teaches the modification of the prior art camera tube. More specifically, improved results were obtained by positioning a thin layer of gold beneath the selenium target. A thin layer of gold will act as an electron emitter and thusly an intensifier to convert the incident X-radiation photons into beta rays or electrons. The converted radiation is absorbed in the selenium with a resultant increased photoconductivity. It has been found that an optimum layer of gold is in the range of 2–100 microns, depending on the thickness of the selenium and other factors, such as the quality or wavelength characteristics of X-rays used. Gold layer and other heavy metal intensifiers may be desirable only above perhaps 150 kv. X-rays. High-voltage X-radiation is not highly absorbed in selenium targets—thus intensifiers can add to signal strengths.

The prior art camera tubes have faceplates of borosilicate glass of 0.090 or (more recently) 0.060-inch silica glass thickness. Such thicknesses of glass can absorb as much as 50 percent of the incident X-ray beam intensity at moderate X-ray kilovoltages, and serve to scatter radiation as well. For the examination of structures, where minute dimensions must be revealed with high contrast, the added glass thickness of the window greatly reduces image contrast. Although the image definition is adequate to reveal the direction of the strands, the image contrast is low because of the added filtration in the glass window. Because of the difficulty, even with film radiography, of revealing individual fibers in certain structures, it is not reasonable to expect optimum image contrast when images must be projected through considerable thicknesses of glass. Windows of high transparency to low-voltage, long-wavelength X-rays are necessary in camera tubes for inspection of minute dimension and/or low density materials.

The present invention further provides a camera tube with a faceplate 23 of FIG. 2 of beryllium, a low-density material with good transmission of long-wavelength X-radiation. However, beryllium windows are not necessary in X-ray camera tubes for examing certain materials such as steel missile case wall materials and weldments, where higher-voltage X-rays are used, and absorption in the steel test specimens is far greater than in the present glass windows. The beryllium-window tube has shown that it offers a great potential improvement in the contrast of fiber glass material X-ray images. A typical beryllium-window vidicon tube, designed and fabricated during this investigation, attained a response exceeding $5 \times 10^{-8}$ amperes at 100 r./min., with radiation from a conventional X-ray source. When used with a beryllium-window X-ray source, great improvements in response to very low voltage radiation resulted.

Tests at various target control voltages have shown that camera tubes are capable of operation in different modes, dependent upon tube target design and target control voltages applied. In the first operational mode, the vidicon tube produces a positive output signal and a positive image appears upon the kinescope screen (if operated with the television chain in the conventional positive switching position). Signal levels are intermediate in magnitude, and characteristic gamma values are in the range from 0.7 to 0.9. If the target control voltage is increased when the penetrating radiation is incident upon the camera tube, the camera tube images can be made to invert to negative images. The point of inversion from positive to negative has been found in a preferred embodiment to be in the order of 20 to 50 volts for the target control. The critical voltage being dependent on tube structure and age, and insofar as is presently known, must be empirically chosen. It has also been found that in those tubes modified to include a gold intensifying layer, as explained above, will operate at a significantly higher target voltage for first mode operation resulting in an improved signal. Camera tubes also have stable operation, under proper control conditions, in a second (negative) operational mode. This second mode produces negative output signals of considerably higher magnitudes (often approaching 200 percent of the maximum signal level attained in the positive mode). Gamma values (or slopes of the transfer characteristic curves) are usually lower, about 0.4 for typical glass-window camera tubes. Operation in this second mode can provide improvements in X-ray response signals to the order of 2000 percent of more of the typical response of ordinary light-sensing tubes to X-rays. With present signal-to-noise ratios, this improvement in signal level more than compensates for the loss in gamma value, as measured by limiting penetrameter sensitivity tests, for example.

Anomalies occur in the relations between first and second mode gamma characteristics, with beryllium-window camera tubes. Gamma values of the order of 0.8 characterize the positive mode and higher gamma values, typically about 1.0, are attained in negative mode. Unusual overall system contrast characteristics have been attained with beryllium-window tubes operating with low-voltage X-radiation, in the second (negative) mode.

Through the use of new camera tubes, modified in accordance with the teachings of the present invention, that is, with thicker selenium layers, dense metal intensifying layers, and/or beryllium window, modern television camera-monitor chains of improved signal transfer characteristics, fine focal spot X-ray sources, and relatively large image monitor tubes, X-ray image reproduction of discontinuities of minute dimensions in materials and weldments is attained. The system offers potential advantages over X-ray film inspection of (a) macroscopic detail resolution, (b) instantaneous inspection, (c) greatly-enlarged image presentation for easy viewing and analysis, (d) high-speed, low-cost production inspection, (e) possibility of providing multiple images for more than one inspector, or of magnetic tape records which could be stored permanently if required, for comparison with service failures at a later date, (f) lower costs, and (g) elimination of film processing and its delays.

The system of the present invention presently provides two percent penetrameter contrast sensitivity in steels of thicknesses up to ¼ inch, which compares favorably with the penetrameter sensitivity obtained in film radiography. In addition, the system provides image enlargements of the order of 30 diameters, with detail resolution approaching $\frac{1}{1000}$ inch. It also permits continuous scanning of the test materials, with negligible blurring of the images. Since the enlarged images can be viewed at a distance from the X-ray exposure area, continuous in-motion inspection is possible without exposing the inspector to hazards from ionizing radiations. Consequently, the system appears to offer considerable promise as a means for the instantaneous detail X-ray inspection of materials and weldments. In addition, recent preliminary tests have demonstrated the potential capability of the system to reveal the individual fibers in thin layers of composite materials such as glass fiber laminates. Thus, it appears possible that the same type of system is adaptable for low-voltage, high-contrast X-ray inspection of fiber glass missile case structures.

The contribution of in-motion scanning of weldments to the visibility of discontinuities and geometric irregularities in weldments in missile case materials is significant. Observers often see clearly the progress of small discontinuities across the viewing screen, whereas the same discontinuities can be much more difficult to detect with stationary images. Under some scanning conditions, with thicker materials of sufficiently low density to permit high transmitted radiation intensities, a pseudo-stereoscopic effect related to the short source-object distances assists the observer to visualize the location of discontinuities with respect to top and bottom surfaces of test materials.

Tests to date have demonstrated the capability of the X-ray image enlargement system to respond to discontinuities in weldments, in stainless or in ferromagnetic steel sheets throughout the thickness range from 0.010 to 0.250 inch. Minute porosity has been observed in electron-beam welds in 0.010-in. stainless steel. Porosity and inclusions have been observed and measured as smaller than 0.01 inch in diameter in ⅛-in. high-tensile steel missile case materials. Lack of root penetration, undercut, and overlap appear clearly in weld images throughout the thickness range of 0.010 to 0.250 inch. Specimens with fine cracks in wall or weldment areas have been visible with results comparable to those obtained with fine-grain Class I films exposed optimumly at long source-film distances, in limited exploratory tests. Brazed honeycomb structures are shown in minute detail with extreme clarity. Conditions such as fillet formation at core-to-skin bonds, node flow conditions, intermittent fillets, crushed core or deformed cells, burred core, and even the spotweld deformations along core cell node flats, have been revealed.

Small, critical electronic components, such as semiconductor elements like diodes or transistors, or miniature electron tubes, can be examined for details such as broken support wires or leads, connections to crystal elements, and other high-contrast radiographic details. Small assemblies containing hidden internal moving parts can be observed in operation, possibly while subject to accelerations or other extreme service conditions, to determine cause and nature of malfunctions in service. For example, the internal movements of gears, springs, and ratchets in small watches have been observed readily with the system, where adequate X-ray intensities could be transmitted through the case materials. Finally, the system has been tried on small mammals (such as the mice that presently serve as passengers on some missile flights). In the case of a baby mouse, the images showed remarkable clarity in revealing structure of the mouse's head and soft tissues while in motion, or the movements of the chest cavity during breathing or heartbeats. It is conceivable that such techniques of observation might provide more detailed information on reactions of living animals to the stresses of space flight than other forms of instrumentation presently in use.

Although there is described above certain specific embodiments, it is to be understood that modifications may be made thereto without departing from the true spirit and scope of the invention.

We claim:
1. A closed circuit television system comprising a source of X-radiation for irradiating a workpiece, a camera tube including a vacuum envelope having a faceplate at one end thereof of a low density material to permit the uninhibited passage of X-radiation, an electrically conductive layer on said faceplate, and a target layer of selenium exceeding five microns in thickness deposited on said conductive layer, means for repetitively scanning said target layer with an electron beam at a fixed frame rate, said target layer converting the latent image formed by said X-radiation unabsorbed by said workpiece into electrical conductivity changes, means connected to said target layer having a voltage drop thereacross proportioned to said conductivity changes and operative to convert said changes into electrical signals; a video amplifier connected to said last named means to amplify said electrical signals, a viewing monitor, and means for connecting said amplified signals to said monitor; said camera tube further comprises a positive and negative operational mode, and means for applying a control voltage to said target layer of a magnitude below a predetermined level to maintain said electrical signals positive and means for applying a control voltage to said target of a magnitude exceeding said predetermined level to convert said electrical signals to negative.

2. A closed circuit television system as set forth in claim 1 wherein said selenium layer in said target has an optimum thickness in the range of 25 to 35 microns.

3. A closed circuit television system as set forth in claim 1 wherein said selenium layer in said target has a thickness in the range of 5 to 300 microns.

4. A closed circuit television system as set forth in claim 1 wherein said selenium layer target in said camera tube further includes a heavy metal intensifier positioned adjacent said selenium, on the side opposite that upon which scanning electron beam is incident.

5. A closed circuit television system as set forth in claim 1 wherein said control voltage is in the order of 20 to 50 volts.

6. A closed circuit television system as set forth in claim 1 wherein said target layer further comprises a gold intensifier positioned beneath said selenium and wherein said control voltage is in the order of 40 to 80 volts.

References Cited
UNITED STATES PATENTS

| | | | |
|---|---|---|---|
| 2,862,126 | 11/1958 | Ploke | 313—66 |
| 2,890,360 | 6/1959 | Jacobs | 313—65 |

ROBERT L. GRIFFIN, Primary Examiner

HOWARD W. BRITTON, Assistant Examiner

U.S. Cl. X.R.

313—65, 89; 315—10